(12) United States Patent
Hintz et al.

(10) Patent No.: US 8,358,809 B2
(45) Date of Patent: Jan. 22, 2013

(54) SYNTACTIC SIGNAL RECOGNIZER AND PATTERN RECOGNIZER

(76) Inventors: Kenneth J. Hintz, Fairfax Station, VA (US); James Corey Wright, Leesburg, VA (US)

( * ) Notice: Subject to any disclaimer, the term of this patent is extended or adjusted under 35 U.S.C. 154(b) by 1259 days.

(21) Appl. No.: 11/782,614

(22) Filed: Jul. 24, 2007

(65) Prior Publication Data
US 2008/0025614 A1 Jan. 31, 2008

Related U.S. Application Data

(60) Provisional application No. 60/820,297, filed on Jul. 25, 2006.

(51) Int. Cl.
*G06K 9/00* (2006.01)
*G01V 3/00* (2006.01)
*G01S 3/02* (2006.01)

(52) U.S. Cl. ........ 382/106; 382/209; 324/332; 342/118; 342/459

(58) Field of Classification Search .................. None
See application file for complete search history.

(56) References Cited

U.S. PATENT DOCUMENTS

| | | | |
|---|---|---|---|
| 6,944,341 B2 * | 9/2005 | Loce et al. | 382/209 |
| 2003/0035582 A1 * | 2/2003 | Linhart | 382/209 |
| 2006/0087471 A1 * | 4/2006 | Hintz | 342/22 |
| 2007/0241954 A1 * | 10/2007 | Hintz | 342/90 |

OTHER PUBLICATIONS

Sands et al. (Feb. 1990) "Pattern representations and syntactic classification of radar measurements of commercial aircraft." IEEE Trans. on Pattern Analysis and Machine Intelligence, vol. 12 No. 2, pp. 204-211.*
Borges, J.A. (Dec. 2004) "Chapter #8: Finite State Machine Design (Contemporary Logic Design)". Published online at http://www.ece.uprm.edu/~borges/Chp8.pdf.*
Massachusetts Institute of Technology (2004). "L10: Major/minor FSMs, Lab 3, and RAM/ROM instantiation." http://web.mit.edu/6.111/www/s2004/LECTURES/l10.pdf.*
T. J. Desai and K. J. Hintz, "Volumetric Signal Processing Hardware Acceleration for Mine Detection," Detection and Remediation Technologies for Mines and Minelike Targets VIII; Russell S. Harmon, John H. Holloway, Jr., J. T. Broach; Eds., Proc. SPIE vol. 5089, pp. 863-871, Orlando, FL, Apr. 2003.
K. J. Hintz, "SNR improvements in NIITEK ground penetrating RADAR," Detection and Remediation Technologies for Mines and Minelike Targets IX; Russell S. Harmon, J. Thomas Broach, John H. Holloway, Jr.; Eds., Proc. SPIE vol. 5415, pp. 399-408, Orlando, FL, Apr. 2004.
K. J. Hintz, "Preprocessing of Ground Penetrating RADAR Data for Resolving Internal Structure."
Chetlur-Kannan, "Landmine Detection Using Syntactic Pattern Recognition."
K. J. Hintz, "Development of a Language Recognizer for Detecting Non-Metallic Landmines in GPR Signals," Final Report: NIITEK PO No. S03-003-1 GMU, Jan. 2005.
K. J. Hintz, "The Language of Mines," 2005.
Chetlur-Kannan, "FSM Maker with +/− 2 Dither."
K. J. Hintz, "PSF/TDR for Mine Detection," 2006.

* cited by examiner

*Primary Examiner* — Barry Drennan
(74) *Attorney, Agent, or Firm* — David Grossman

(57) ABSTRACT

A pattern recognizer includes a sequential data extractor, a data pairer, and a recognition engine. The sequential data extractor extracts a region of measured data obtained from a measuring device. The measuring device is preferably capable of detecting changes in impedance. The measured data should contain position information of the changes in impedance. The data pairer associates the region of measured data with a priori pattern data that contains expected positions of the changes in impedance. The recognition engine decides whether the associated region of measured data and the a priori pattern data differ within predetermined criteria, the predetermined criteria including: non-expected impedance changes; excessive dither; and missing impedance changes.

14 Claims, 12 Drawing Sheets

Binary sequence describing landmine -
"10001000000001000010000000000001000000000000010000100000000
10000100000000100001000100001000000001"

SYNTACTIC SIGNAL RECOGNIZER AND PATTERN RECOGNIZER

CROSS-REFERENCE TO RELATED APPLICATIONS

This application claims the benefit of U.S. Provisional Application No. 60/820,297, filed Jul. 25, 2006, entitled "Pattern Recognizer," which is hereby incorporated by reference in its entirety.

DETAILED DESCRIPTION OF THE INVENTION

Figure 1:
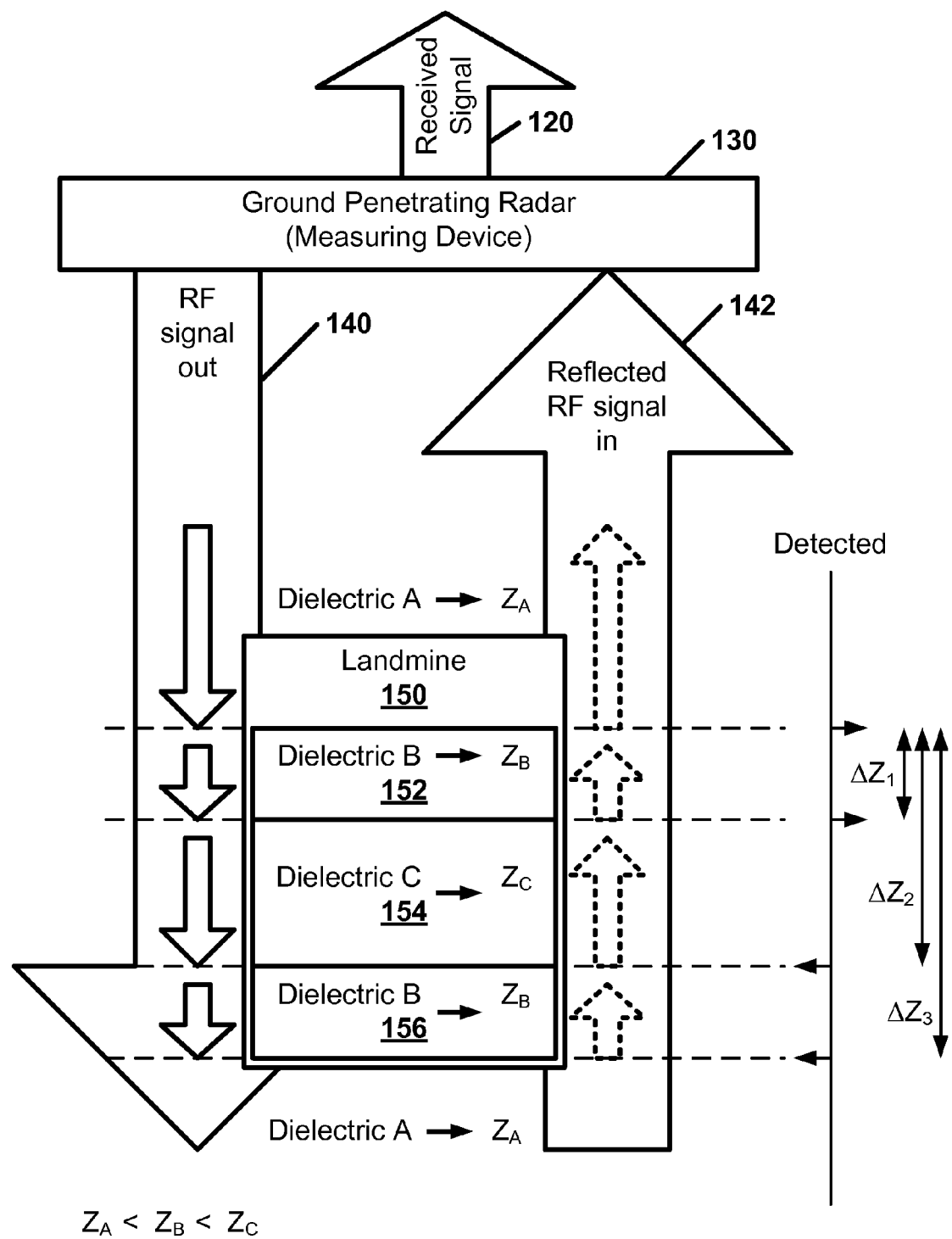
FIG. 1 is a diagram showing how reflections of an RF signal indicate changes in impedance caused by the structure of a landmine as per an aspect of an embodiment of the present invention.

Embodiments of a syntactic pattern recognition technique are disclosed. One embodiment uses a serial major-minor reset finite state machine. Another embodiment uses a parallel logically combined set of correlators. Both embodiments allow for dynamic programming of mine patterns of interest. Among other uses, these embodiments may be used to process ground penetrating radar (GPR) signals to locate objects such as land mines. Both of these embodiments may be implemented in tangible media as computer executable machine readable programs and in synthesizable hardware description language for implementation in field programmable gate arrays and application specific integrated circuits.

Throughout this description, the embodiments and examples shown should be considered as exemplars, rather than as limitations on the present invention.

There are both military and humanitarian reasons for landmine remediation. A significant problem is not detection, but discrimination of landmines from clutter. While clearing landmines, practitioners recently dug up almost 200 million pieces of scrap that were suspected to be mines but which weren't, hence the need for better methods of recognizing patterns that may be used to discriminate landmines from non-landmines. These buried non-landmines which have similarities to landmines are referred to as clutter rather than noise. To further complicate the issue, standard anti-personnel mines can be anywhere from 2-4 inches in diameter and 1.5 to 3.0 inches in height and are made from a variety of materials such as plastic, wood, and sheet metal. They are located in about every environment imaginable including rocky or sandy soil, open fields, forested areas, steep terrain, and jungle. The landmines can be on the surface as well as partially or totally buried.

To be effective, landmine detectors may need to be: inexpensive due to the number of detectors required; fast since there are vast tracts of land that are seeded or thought to be seeded with landmines; capable of detecting various types of landmines; and capable of easy modification to detect new landmine types.

A landmine (a mine) is a munition designed to be placed under, on or near the ground or other surface area and to be exploded by the presence, proximity or contact of a person or a vehicle. Many landmines are difficult or impossible to detect using devices such as metal detectors under most field conditions. An example of such a non-metallic landmine is the VS-2.2 (see FIG. 2). The VS-2.2 is a circular, plastic bodied anti-tank (AT) mine which is designed to damage or destroy a vehicle by blast effect. Versions of this mine are manufactured in Italy and Singapore. The mine has two main components; the body which contains the explosive charge and the VS-N pressure plate/fuse. It has small reinforcing ribs running top to bottom around its circumference and it can be found in a variety of colors, it also has a plastic carrying handle mounted on the side. The mine can be laid by hand in any typical soil including wet ground or snow and it will function in temperatures from −31 degrees centigrade to +70 degrees centigrade. Most importantly, the VS 2.2 cannot be located using metal detectors under most field conditions and it is highly resistant to blast overpressure from explosive breaching systems.

A RADAR is a device for transmitting electromagnetic signals and receiving reflections of electromagnetic signals from objects of interest (targets) within a volume of coverage. Additional information about a target provided by a RADAR may include one or more of the following: RADAR cross section (RCS), bearing, distance (range), description or classification of target by analysis of echoes, and their variation with time. A RADAR operates by transmitting an electromagnetic wave from an antenna. Some radiated electromagnetic wave is reflected from changes in dielectric constant in the propagating medium and from metallic objects in the propagating medium. Changes in dielectric constant can be characterized as impedance discontinuities. The locations on metallic objects which reflect electromagnetic energy are called scatterers. The electromagnetic energy which is reflected from impedance discontinuities and/or scatterers may be received by a receiving antenna. The receiving antenna converts the incident electromagnetic energy into an electric signal which can then be amplified, filtered, and analyzed. This electric signal is the received signal.

A ground penetrating RADAR is a RADAR configured to image objects that are located underground. One such GPR RADAR is manufactured by NIITEK, Inc. of Sterling, Va. This RADAR is a pulsed, bistatic ground penetrating RADAR designed to gather volumetric and high range resolution imaging data.

As shown in FIG. 1, a ground penetrating RADAR 130 is passed over an area of ground suspected of containing landmine(s) 150 while emitting a radio frequency (RF) signal 140. The received signal 120 may then be received from the ground penetrating RADAR 130 which measures a reflected RF signal 142. This measurement may use a device which may include element(s) that responds quantitatively to the received RF signal 142 and performs an initial measurement operation. The measuring device 130 preferably performs the initial conversion or control of measurement energy.

A data processor (including one or more processors) is a device, usually implemented with analog or digital electronics or in software, which "is capable of performing any operation or combination of operations on data or information such as received signal 120 from a ground penetrating RADAR 130.

A received signal 120 from a ground penetrating RADAR 130 is typically a bipolar amplitude varying electrical representation of the RADAR cross section or magnitude of the change in dielectric constant at various ranges from the antenna.

Referring to FIG. 1, we can see how a return signal containing spatial information is generated. The spatial sequence representing spatial information temporally in the time domain reflected signal 142 results from the finite travel time of the electromagnetic wave 140 in a propagating medium. When the electromagnetic wave is launched from the antenna, it travels at approximately the speed of light, $C=3\times 10^{**}8$ meters/second, or approximately 1 foot/nanosecond. When the electromagnetic wave enters a dielectric, its speed changes. Since dielectric discontinuities and scatterers are located at different ranges from the antenna(s), their reflected energy is returned to the RADAR with a delay in time proportional to twice the distance from the RADAR to the impedance discontinuity or scatterer. That is, time in the electrical signal from the receiver generally is directly proportional to the spatial distribution of the target in range.

With the spatial sequence of a landmine's (150) impedance discontinuities (seen at the interfaces of 152, 154, and 156) or scatterers represented as delays in time in the electrical signal, the electrical signal can be a representation of a physical characteristic of a landmine. This, now temporal or equivalently spatial in range, signal may be unique to a particular type of landmine 150 or be representative of several types of landmines which have similar physical characteristics. Since the primary purpose of this device is to detect landmines by discriminating them from non-landmines, a library of characteristic sequences of landmines can be developed from measurements or predicted from scale drawings and used to compare with the received signal 120. Since there may be many range samples on each landmine or non-landmine, there is an extremely small probability that a non-landmine would have exactly the same characteristic signal as a landmine. That is, the detection process consists of discriminating the characteristic sequence of one or more landmines from all the rest of the non-landmine sequences.

Figure 2:
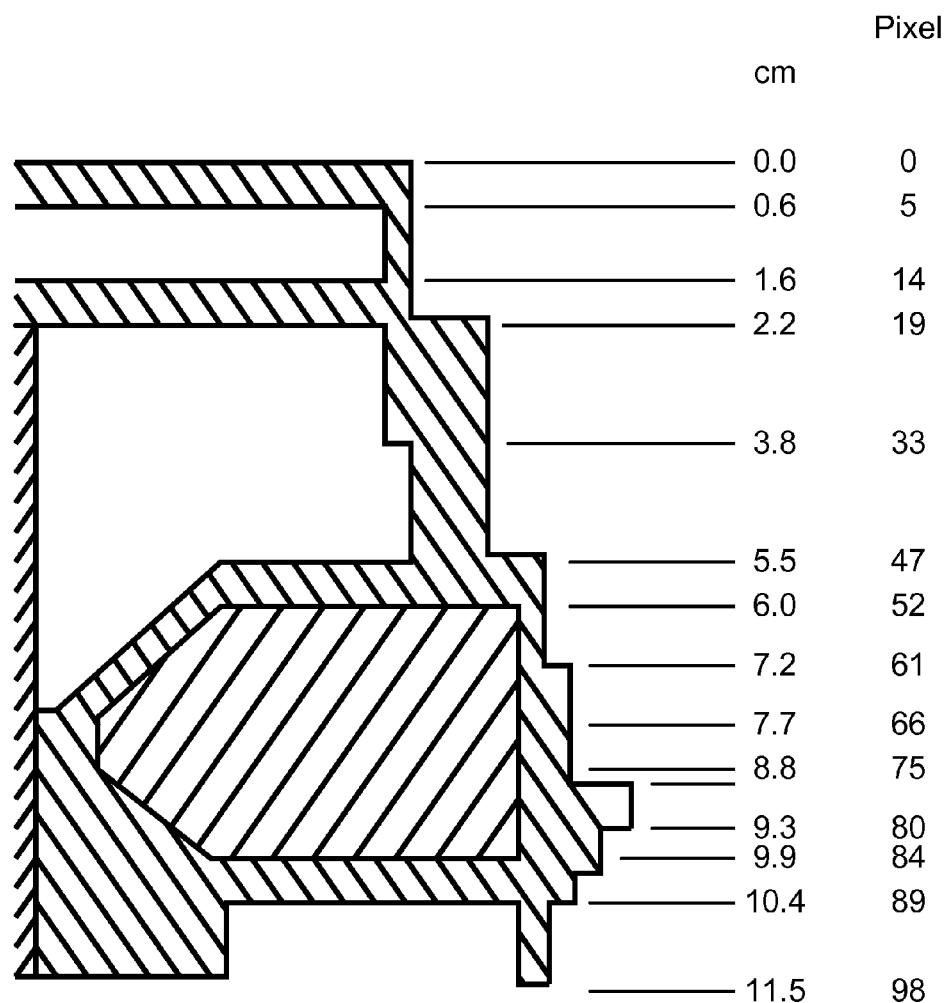
FIG. 2 is a diagram showing locations of impedance discontinuities of an exemplary landmine.

A cross section of an exemplary mine and characteristic sequence information is shown in FIG. 2. Different areas of the mine are made of different materials. Transitions between these areas may create impedance discontinuities. Locations of possible points of impedance discontinuities are shown with their relative position from the top of the mine both in centimeters and quantized pixels. This information may be used to describe the internal structure of the mine. As described previously, the quantized pixels represent the travel time of an RF signal that travels from a ground penetrating RADAR transmit antenna to a point of impedance discontinuity and then reflected back to a ground penetrating RADAR receive antenna.

It is important to note that the spatial sequence of impedance discontinuity or scatterer locations is a sequence which is relative to the first impedance discontinuity or scatterer of the landmine, usually the top. That is, independent of whether the landmine is on the surface, partially buried, or buried at an unspecified depth, the relative location of the impedance discontinuities or scatterers from the top of the landmine is constant. The relative spacing is furthermore independent of whether the landmine is on the surface, partially buried, or buried since this spacing is dependent on the relative dielectrics of the internal materials of nonmetallic landmines or the external spacing of the scatterers on metallic landmines. These relative locations are relatively insensitive to environmental conditions and hence are a measurable and repeatable characteristic of landmines.

Figure 3:
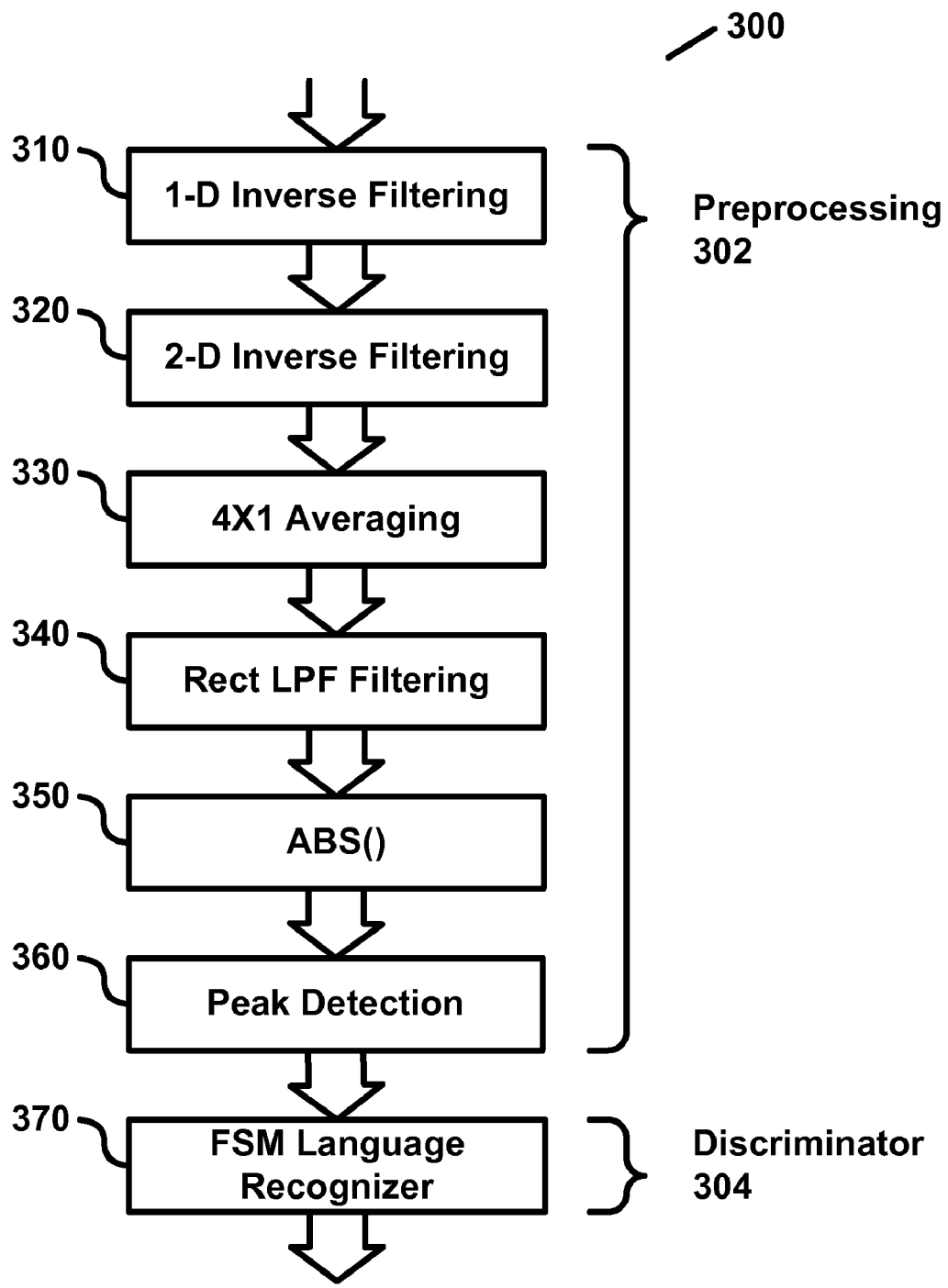
FIG. 3 is a block diagram of a ground penetrating radar (GPR) Processor as per an aspect of an embodiment of the invention.
Figure 4:
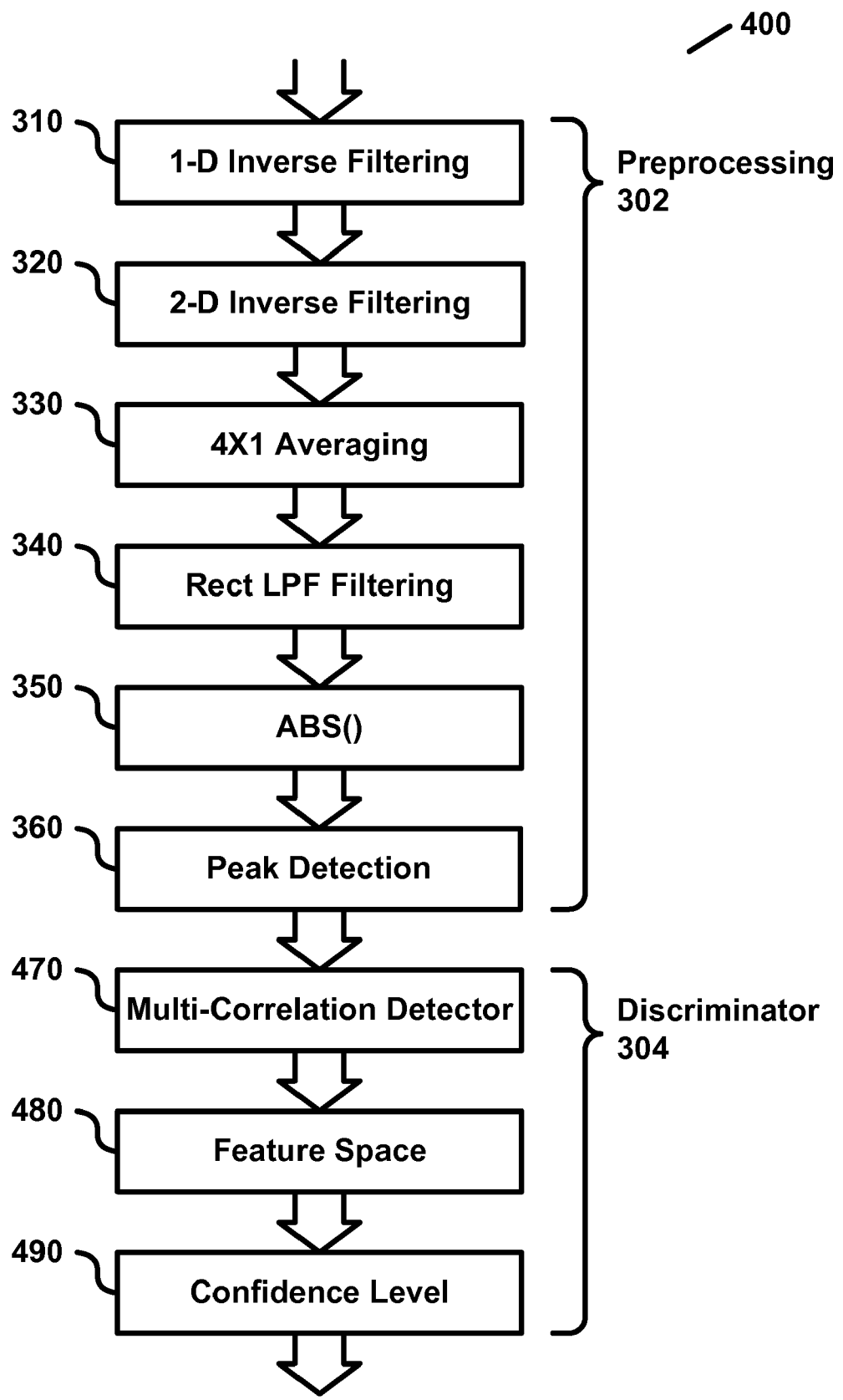
FIG. 4 is a block diagram of a GPR Processor showing an alternative discriminator as per an aspect of an embodiment of the invention.

Ground penetrating RADAR is useful because it can be used to detect changes in impedance within its field of view. In this case, mines buried underground may be of specific interest. Impedance differences between the components of the landmine as well as the landmine and the surrounding soil create reflections. A block diagram of embodiments of syntactic landmine detectors and pattern recognition devices are shown in FIGS. 3 and 4. From reflections at the impedance discontinuities, position information for the changes in impedance may be determined. See for example the expected impedance change locations in a VS 2.2 landmine of FIG. 2. The use of these methods is not limited to only GPR, but could also be used with other measuring devices, provided the measured data contained similar information on impedance discontinuities. Other candidate measuring devices might include: high range resolution RADAR; synthetic aperture RADAR; SONAR; ultrasonic imaging device; infrared sensor device; X-ray device or backscatter X-ray devices.

Similarly, the pattern recognition portions of the algorithms, and their accompanying implementations, are not limited to the detection of mine patterns, but may be applicable to any a priori sequential pattern of symbols such as DNA sequences. While the example is shown with binary valued data, symbols with any number of values can be used as data into alternative embodiments of the syntactic signal processor 300. For these multivalued data, the preprocessing step(s) 302 may be modified to discretize measurement data into a finite set of symbols.

The syntactic signal processor 300 can be divided into two primary steps: 1) Preprocessing 302 of the GPR data to discretize the measurement data into a binary valued sequence, and 2) object discrimination 304 in the form of syntactic pattern recognition. A flowchart showing the major functional blocks for these processing steps is shown in FIGS. 3 and 4.

Previous work has developed a non-reset finite state machine which, while effective, requires large amounts of memory. These new embodiments significantly reduce the size of the finite state machine required to process and classify the data in the received signal 120. The parallel implementation disclosed here improves pattern detection by prioritizing the locations of impedance discontinuities (see, e.g., FIGS. 9, 10, 11, and 12).

Data Preprocessing 302: The preprocessing stage 302 is where received signal 120 may be converted into a binary valued sequence that describes the range location of impedance discontinuities in the RADAR's field of view (FOV). An example of where these discontinuities would be generated for a landmine is depicted in FIG. 2 which is a cartoon view of a VS-2.2 landmine showing differences in material. These differences in material may be detected as impedance changes or discontinuities.

The preprocessing portion 302 of the syntactic signal processor 300 as shown in FIG. 3 is sometimes required to convert the received signal 120 into a recognizable sequence of symbols for presentation to the discriminator 304. The preprocessor 302 may be used to convert the received signal 120 into a sequence of ones and zeros, an example of which is shown at the bottom of FIG. 2. In this example, the ones represent the locations of impedance discontinuities and the zeros represent locations where no impedance discontinuity is detected. One skilled in the art will recognize that other coding schemes may be used, including reversing the values of the ones and zero's or even using multi-bit values. The preprocessor's 302 implementation method may contribute significantly to the determination of the overall speed and size of the detector. The fact that the measurement data is converted to binary values contributes significantly to the speed of the subsequent pattern recognition. Real-valued measurement data can also be converted to a finite set of symbols for syntactic pattern recognition in a similar manner.

An embodiment of the preprocessing consists of converting the received signal 120 to a properly scaled fixed-point representation in order to maintain computational accuracy during the subsequent processing. The received signal 120 from ground penetrating radar (GPR) may be provided in 16-bit signed, twos-complement format. The final output of the preprocessing stage 302 may be a sequence of values such as 1's and 0's that describe the locations of impedance discontinuities. The location sequence is a time domain signal representing range from the GPR. This range determination may need to be of sufficient accuracy to identify the location of most major impedance discontinuities. A nominal range resolution that has been achieved in a GPR and utilized in embodiments so far is 0.2 inches.

The preprocessing 302 may be partitioned into sub-functions for software development on a general purpose computational device such as a computer workstation as well as a field programmable gate array (FPGA) or application specific integrated circuit (ASIC) embodiments. The software versions may be converted to synthesizable hardware description language (HDL) representations for actual implementation in FPGA and ASIC embodiments.

The preprocessing 302 implementation may be chosen as a balance of speed and size and one may make modifications to emphasize one over the other. Speed may be measured in terms of the time it takes for the sensor signal to traverse the critical path. Size may be measured in terms of the number of gates or their equivalent required to implement the preprocessing functions.

There are two factors that may be useful in determining the overall architecture of the preprocessing implementation. The first is that the 1-D Filtering 310 and the rectangular low pass filtering operations 340 both of which may require circular convolution. An alternative is to perform an FFT of the data, multiplying this with weights for each of the filter taps and then performing an inverse FFT to obtain the equivalent result to the convolution integral. While this implementation has advantages in some scenarios, in this case, the expense of the FFT operations and the loss of accuracy due to the fast bit growth and subsequent bit reduction operations may make the circular convolution method preferable. Certainly the fact the data and taps may both be real-valued may make utilizing the Fourier domain, which requires complex data value operations, comparatively expensive. The data may be filtered utilizing a linear convolution. A buffer may then delay the first half of the linear convolution for summing with the second half, to create the circular convolution output. Associated logic may be used to indicate where the data is valid.

The peak detection 360 may simply look for maxima in the data. If a data point is greater than those around it, it may be declared a peak and a discontinuity recorded in the sequence that is fed to the discriminator 304. In the floating point model, the likelihood of two adjacent samples having equal values may be negligible. In the fixed point domain, with quantization affects, this likelihood may be increased. Furthermore, depending on how severe the quantization is chosen to be, there is a greater likelihood that several samples in a row may be of equal value. Rather than only detecting the positive and negative edges of these plateaus, an interpolation method may be created to handle this scenario. The interpolation may be straightforward, simply declaring the peak at the mid-point of the plateau. This interpolation should be enough to significantly increase the accuracy of the fixed point detection algorithm compared to the original method. More complex methods for determining the peak may also be used.

The significance of the described interpolation is that for an even plateau, the position may be rounded down, whereas for an odd length plateau, the exact center may be selected. Since there may be no way to determine the true location of the peak without increasing the bit representation for increased precision, the decision of which location to chose for the even case may be algorithmically arbitrary, but it may cost slightly less in the implementation to round down. There is also the question of how the boundary conditions are handled. For the beginning of the data series, if the slope of the first two data points is negative, then the first sample may be declared a peak. Similarly, for the end of the data series, if the slope of the last two points is positive, the last value may be declared a peak. This interpolation and boundary conditions may require that the entire data frame be analyzed before deciding where the peaks are located. The resulting implementation may determine the peaks, buffer these values as a set of location values until the frame is completely analyzed, and then release reading from the buffer to re-expand the peak locations into a sequence of ones and zeros. Ones may indicate peaks which are the locations of the impedance discontinuities.

Calculations based on an embodiment have shown that with a downrange sample frequency of approximately 1 cm per downrange scan, a process time of 4.19 ms/scan means a measuring device 130 should be able to cover 1 meter every 0.422 seconds for a net speed of 5.3 miles per hour. At the more standard downrange sampling frequency of one sample every 5 cm, the net speed should increase to 26.5 mph. The processing latency is on the order of 10 ms for the preprocessing, and any additional latency due to the actual FSM and correlator discriminators should be negligible.

Another important throughput consideration is the time it takes to load a new scan of data. A clock rate of 100 MHz includes place and route timing for the bus interface. The incoming GPR data may be 16-bits, so across a 32-bit bus that supports bursting (consecutive writes on every clock cycle after the initial write) an entire scan could be transferred in about 50 ms. Some embodiments may not support processing the scan while loading another. However, minor modifications could allow pipelining the processing of individual scans. Another approach is to ping-pong between two input buffers, so new data can be written while data is being processed out of a second buffer. An actual system may support analog to digital converters (ADCs) directly interfacing to the FPGA which eliminates the bus interface and its associated delay.

The preprocessing operations 302 may be implemented in a device such as an XC4VSX55-12 FPGA available from Xilinx, Inc. of San Jose, Calif. Even with the apparently large size of the preprocessing operations, when compared to the resources available in the XC4VSX55-12 FPGA, the preprocessing should only require a modest 25% of the device, suggesting that a downgrade to the XC4VSX25-12 should still fit the design with similar performance, or even an XC4VLX25-12. This shows the feasibility of putting these types of algorithms into an FPGA, and there are areas for improving the design in both size and speed to be explored given a more defined set of implementation requirements.

To test the use of these dedicated resources, the preprocessing can be re-implemented through place and route allowing use of the DSP48 blocks with significant performance improvements. These resource requirements indicate the design should be able to fit into the smallest Virtex-4 device, the XC4VLX15-12. The critical path should be reduced by approximately 34%, making the new top speed of processing at the 5 cm sampling rate, approximately 40 miles per hour.

Figure 6:
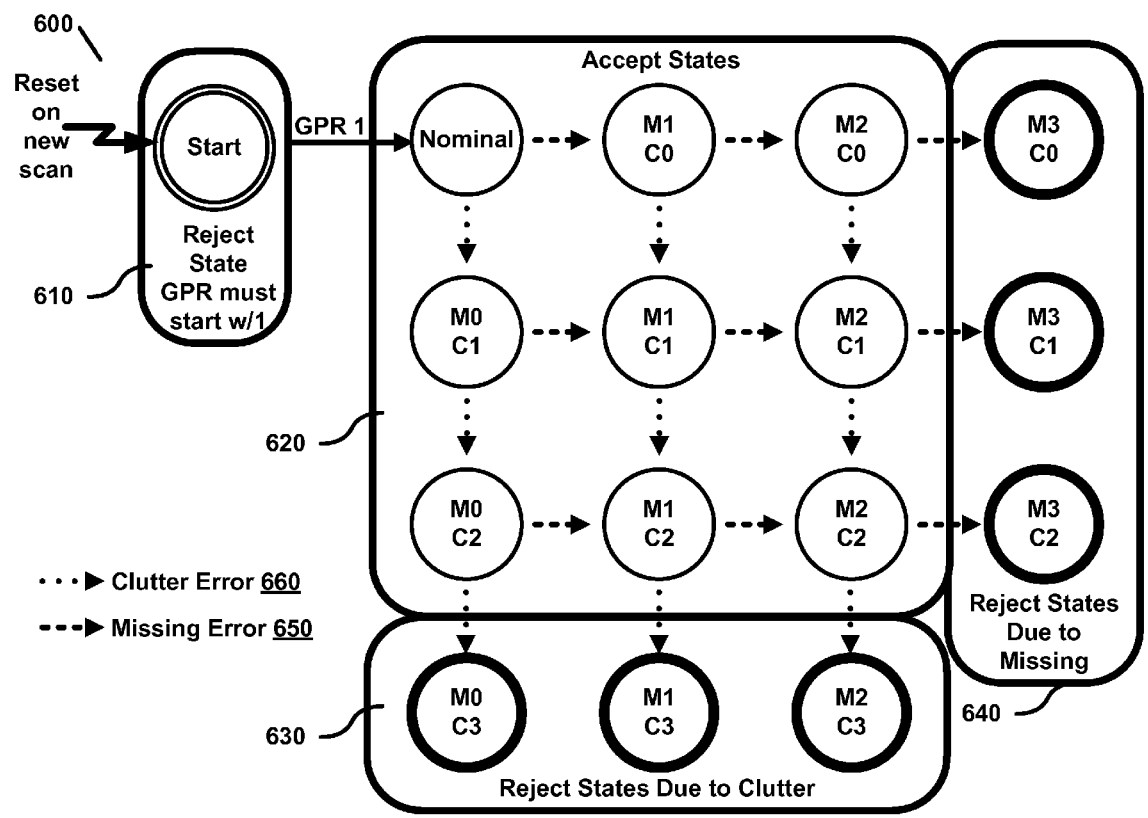
FIG. 6 is a conceptual state transition diagram of the major and minor states in a reset FSM pattern recognizer as per an aspect of an embodiment of the invention.

Finite State Machine Pattern Recognizer 370: FIG. 3 shows a block diagram of an embodiment of a landmine detector with a reset FSM syntactic language recognizer 370. This embodiment may be implemented in a FPGA. An important part of the state machine may be in the transition matrix itself, and in particular for the FPGA implementation, it may be important to properly select the encoding method for the states. The transition matrix is an embodiment of the state transition function, a mapping of pairs of inputs and present states to the next state. The FSM states of the present invention may be conceptually organized into major and minor states as shown in FIG. 6. The major states 610, 620, 630, and 640 of the finite state machine 600 are dependent on the number of missing impedance continuities and the clutter errors detected. The minor states shown in 620 and detailed in FIG. 7 handle the actual determination of individual missing and clutter errors.

A state transition diagram of the major and minor state transitions of an embodiment of a reset FSM pattern recognizer is shown in FIG. 6. At the start of processing, the major state machine begins in the start state 610. This is not an accept state, since there may be a requirement that the first data sample in the GPR scan must start with a 1. If the initial 1, which is the top of the landmine or the first impedance discontinuity of the landmine detected by the RADAR, is found, the current embodiment allows for up to two missing discontinuities 650 and up to two clutter errors 660. One skilled in the art could build an embodiment which allows for more or fewer clutter errors 660 or more or fewer missing discontinuities 650. As long as these errors are below the chosen numbers a object discrimination is reported. If either threshold is exceeded, the state machine reports no object discrimination.

Figure 7:
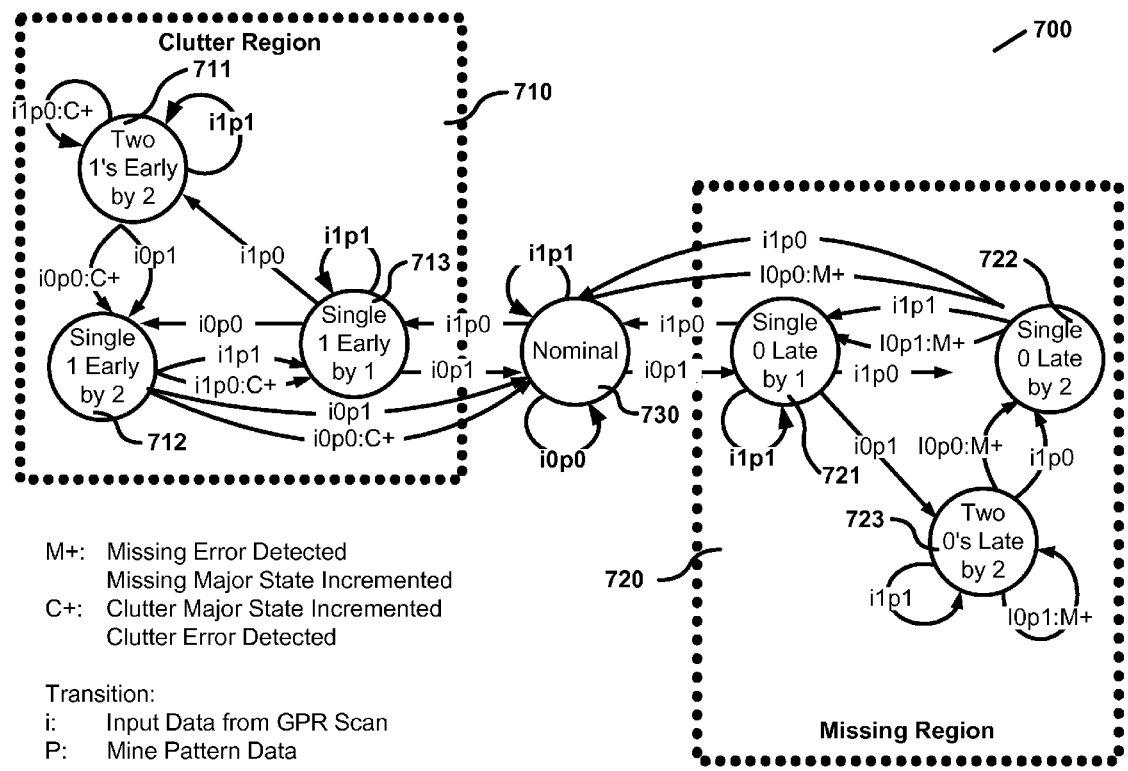
FIG. 7 is a detailed diagram of state transitions in a reset FSM as per an aspect of an embodiment of the invention.

A detailed description of the state transitions in the reset FSM pattern recognizer 700 is shown in FIG. 7. The minor state machine starts in the nominal state 730. As long as the input GPR data and mine pattern match, the minor state machine stays in the nominal state. From this state there are two ways to exit. One is that the incoming GPR data is a 1, and the mine pattern is a 0. In this case, there is the potential for this to be a clutter error, and the minor state moves to the "single 1, early by 1" state 713 in the clutter region 710 of the FSM 700. The other exit from nominal 730 is that the incoming GPR data is a 0, and the mine pattern is a 1. This may be a missing error, and the minor state moves to the "single 0, late by 1" state 721 in the missing region 720 of the FSM 700. A dither requirement may allow for a 1 in the GPR data to be +/−2 locations from the corresponding 1 in the mine pattern. So after an unmatched input pair, it may take up to two more input pairs to determine if the unmatched pair was an error or not, as one of these inputs could balance the GPR data to mine pattern discontinuity count. Also since the dither amount is two, there is the potential to accumulate errors, where two inputs pairs in a row are unmatched in the same direction, such as two pairs with 1's in the GPR data and 0's in the mine pattern. This situation maybe tracked by the "two 1's, early by 2" state 711, and "two 0's, late by 2" state 723. When the dither grace period has been exceeded without a difference in inputs being compensated, the appropriate error should be declared. This preferably changes the major state which should ultimately determine the accept/reject.

Figure 5:
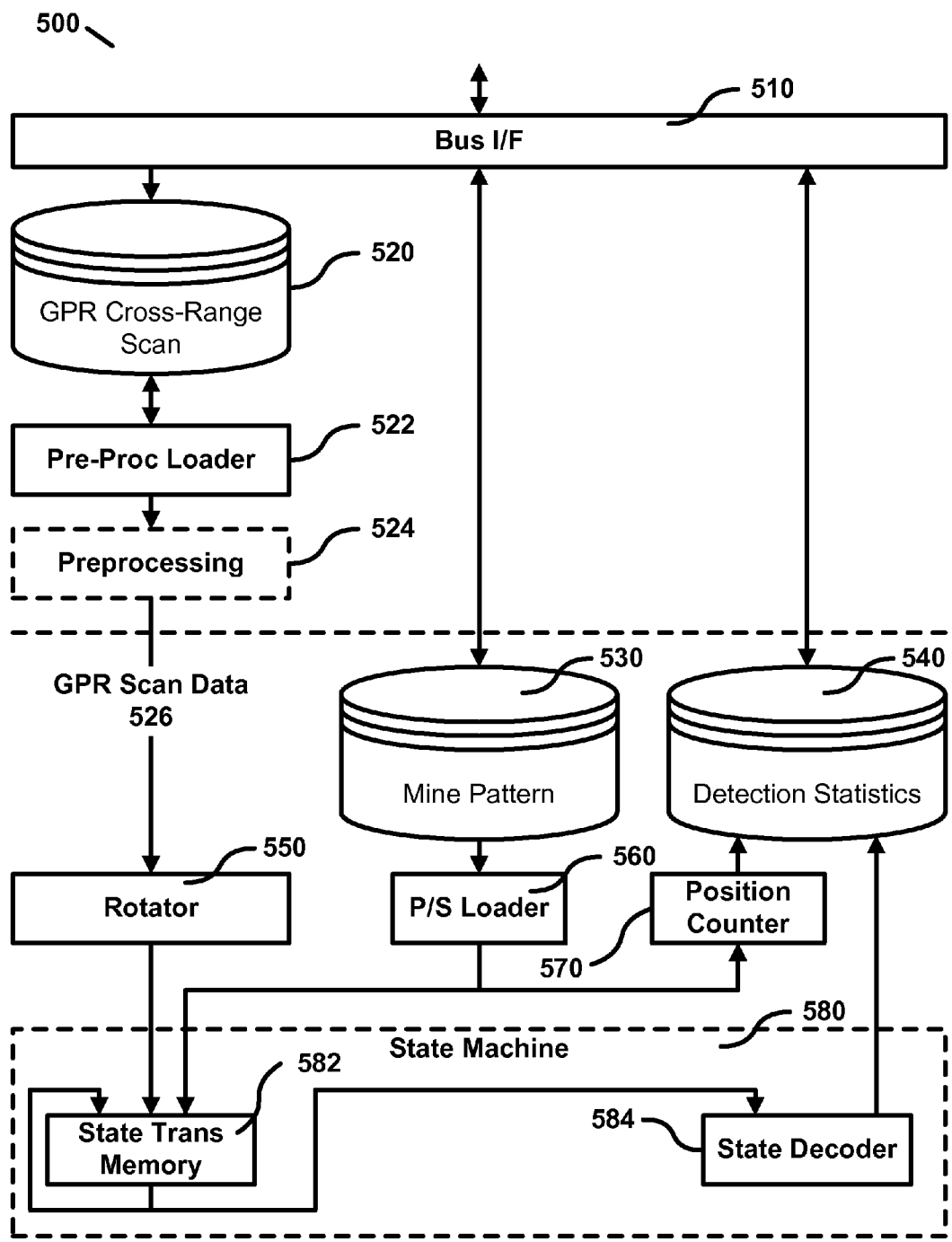
FIG. 5 is a block diagram of an embodiment of a landmine detector with a reset finite state machine (FSM) recognizer as per an aspect of an embodiment of the invention.

FIG. 5 is a block diagram of an embodiment of a landmine detector with a reset FSM recognizer 500 as per an aspect of an embodiment of the invention. This reset FSM pattern recognizer embodiment 500 is a serial processor that operates on sample pairs of GPR scan data from a GPR crossrange scan 520, and mine pattern data 530. Although this embodiment uses an embedded FPGA memory for its present state memory as well as its next state transition matrix, it could be external to the FPGA as well. The preprocessor 524 may receive GPR cross-range scan 520 from a pre-processor loader 522 and outputs serial GPR impedance discontinuity data. This allows depth position counter 570 to indicate the correct depth, and synchronizes the rotator 550 and parallel to serial (p/s) loader data pairing operation 560.

The rotator 550 may sequentially extract regions of data from the incoming GPR data 526 for comparison to the mine pattern 530. First, the rotator 550 may queue up the number of samples equal to the mine pattern length. After this region of GPR discontinuity data has been collected, processing beyond this stage may be enabled. For every input sample, the rotator 550 may rotate through the queued samples at an accelerated clock rate, that may be at least m times faster than the incoming discontinuity sample rate, where m (mine pattern length+2).

The mine pattern parallel/serial (P/S) loader's 560 operation may be synchronized with the rotator 550. The mine pattern parallel/serial loader 560 may read the mine pattern from the mine pattern memory 530 and serialize it. Operation may be restarted on the beginning of every set of m clock cycles, outputting a single mine pattern value every clock cycle.

This synchronization between the rotator 550 and p/s loader 560 should create a sequence of GPR and mine data pairs as inputs to the state machine 580. The state machine 580 may then compare the GPR 526 and pattern data 530 to see if they match.

After the entire mine pattern 530 has been processed, the state machine 580 may pass its final state to the statistic memory 540 for storage. The depth position counter 570 may increment and the processing suspend until the next sample is input. At this point the GPR scan 526 should have been completely analyzed, and the FSM 580 generates an interrupt to the bus interface 510 indicating processing has been completed.

As already mentioned the present state and state transition matrix are both contained in the state transition memory 582. On reset, the present state may be initialized to the start major state, and nominal minor state. The encoding selected for the state transition matrix makes this state value 0. The input GPR data 526 and mine pattern 530 may each be one bit. These are concatenated with the present state to create an input address to the state memory.

Figure 8:
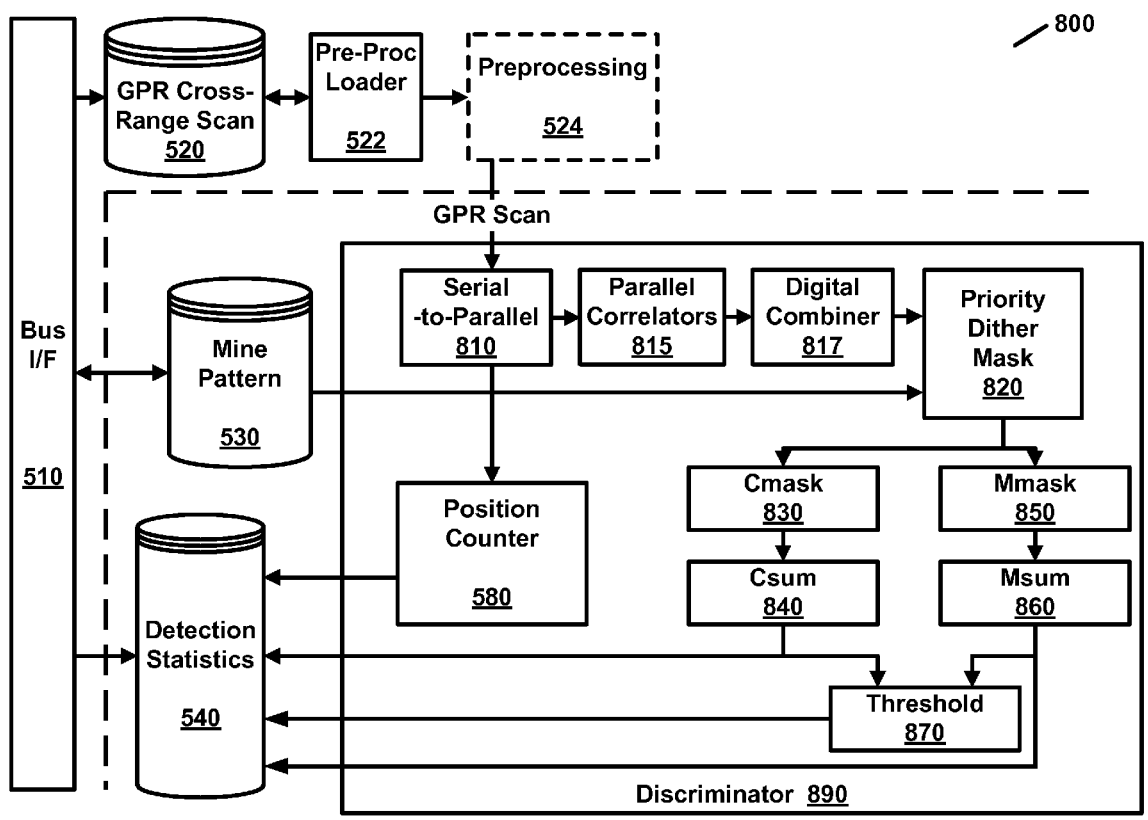
FIG. 8 is a block diagram of an embodiment of a landmine detector with a parallel correlator pattern recognizer as per an aspect of an embodiment of the invention.

Parallel Correlator Pattern Recognizer: FIG. 8 is a block diagram of an embodiment of a landmine detector with a parallel correlator pattern recognizer 800 as per an aspect of an embodiment of the invention. This pattern recognizer embodiment 800 utilizes a set of parallel correlators 815. Each correlator looks for a specific sequence of symbols, e.g. for the binary-valued received signal 120 from the measuring device 130, 101, 1001, 10001, 100001, etc. The outputs from these impedance spacing detectors may be referred to as positive indicators. Selected outputs of these digital correlators may be digitally combined in a digital combiner 817 to represent a unique landmine sequence of impedance discontinuities along with their dithered counterparts. Two competing conditions should be met to declare detection. First, there should be a high percentage of positive indicators or matches to the mine pattern 530. Second, there should only be a limited number of negative indicators. Negative indicators may be produced by the priority dither mask 820. The output of the priority dither mask 820 may be further divided into the clutter mask CMask 830 and the missing mask MMask 850. These negative indicators may be counted in clutter mask summer CSum 840 and missing mask summer MSum 860. The output of CSum 840 and MSum 860 may be tested to see if they exceed a preset value in threshold 870. A large number of negative indicators might suggest clutter or noise and not a mine.

The second pattern recognition method involves an implementation of a regular language recognizer in the form of a finite state machine (FSM) or syntactic pattern recognizer. The pattern of discontinuities that describes the mine should be sufficient to describe a language that can be used to create a finite state machine for mine detection. The discontinuity data may be compared sample by sample to the mine pattern of interest in a reset FSM and transition through states depending on whether samples match or do not match. Compared to the correlator algorithm, the state machine does not have a final thresholding stage. The thresholds are already taken into account when creating the finite state machine and in determining its accept and reject states.

To achieve this preprocessing and more accurately locate the range locations of impedance discontinuities, each channel's received signal 120 may first be inverse filtered 310 with a measuring device's 130 point spread function (PSF). This 1-D filtering converts the bipolar measuring device's 130 received signal 120 into a pulse of approximate minimum width. Unlike the normal matched filter which is the correlation of the received signal with the transmitted signal with the width of the result depending on the autocorrelation properties of the transmitted signal, the inverse filtered signal in the ideal case has zero width and infinite amplitude. Practically, the limited length of the FFT or convolution integral produces a finite width pulse but one which is typically narrower than the autocorrelation function of the transmitted signal 140.

After performing the 1D inverse filter 310 on each single range channel of an array of measuring devices 130, a 2-D inverse PSF filter 320 may be performed across the array to remove the effects of energy spreading across spatially adjacent channels. This adjacent channel crosstalk may yield returns from a point which produce an undesirable and incorrect parabolic representation of the point scatterer. This inverse PSF 320 has been shown to improve the peak signal to RMS noise ratio (SNR) by an average of approximately 3.6 dB. The absolute value 350 of the bipolar signal may then be taken and a threshold is applied to identify the range location of impedance discontinuities. The resulting signal should now be a sequence of binary values. In the current example, the sequence would be a binary sequence of 1's and 0's 417 samples deep, where a 1 represents a discontinuity, and a 0 is no discontinuity. If a measurement device with sufficient spatial resolution is available, the technique can be applied in directions other than range only.

Mine Recognizer: The pattern of discontinuities identified by the preprocessing 302 may be sufficiently unique that it can be used to detect mines which have been previously characterized from physical measurements or diagrams (For example, the mine shown in FIG. 2). Not only should mines be differentiated from clutter, but in many of the mines analyzed, the different mine types should also be distinguishable from one another.

FPGA Implementation of FSM Pattern Recognizer: The reset FSM pattern recognizer of an embodiment has been implemented in 128 states, and should be able to detect any mine pattern of arbitrary length. The FSM is agnostic to the number of discontinuities in the mine pattern. This agnostic behavior is as compared to an earlier non-reset FSM which has, for an example VS 1.6 mine pattern of length 77 with discontinuities at [1, 15, 34, 45, 59, and 74] 25,572 states. The memory for the state machine transition matrix may need to be at least 32,768×17 which is about 557 kbits (31 Xilinx BRAMs), compared to the 4.6 kbits (1 Xilinx BRAM) of the new reset FSM. In addition, the non-reset method may have the mine pattern hard coded into the creation of the state machine. To detect a new mine pattern, a new state machine may need to be designed. Even though this may be done automatically, it may still take a significant amount of time to generate. For example, using current technology, pattern creation in the non-reset FSM took approximately 7 seconds for a 5 discontinuity pattern, and 10 hours for a 7 discontinuity pattern. The present reset FSM pattern recognizer should only change if the criteria for detection changes. To discriminate a different mine pattern, the pattern only needs to be loaded in the mine pattern memory in the FPGA, which can be done dynamically. It does not necessarily require a separate FPGA load. These advantages in the FPGA implementation may come at the cost of decreased efficiency in the number of transitions the FSM must go through to reach a decision output. The non-reset FSM, is able to processes the entire GPR scan once from beginning to end. The reset FSM pattern recognizer described here may require the FSM to run to completion for every possible mine depth location in the GPR scan or be replicated in parallel to enable faster execution.

Embodiments of the reset FSM pattern recognizer may be implemented in synthesizable VHDL code. The design may be analyzed for dependencies on the mine pattern of interest, and then synthesized over a range of cases to determine the implementation metrics. In the case of the reset FSM pattern recognizer, the primary dependency may be the length of the mine pattern. The reset FSM pattern recognizer should have no dependency on the number of discontinuities in the mine pattern, and there should only be a small dependency on the length of the mine pattern. The latency through the reset FSM pattern recognizer may be dependent on the length of the mine pattern and the depth of the GPR Scan.

FPGA Implementation of Parallel Correlator Pattern Recognizer: The particular impedance discontinuity spacings that are characteristic of a particular landmine may be selected from a set of single bit correlators. These spacings and the spacings +/−1 and +/−2 spacings may be XOR'd together. If there is only one discontinuity in the range a 1 is output from the XOR, indicating a positive match. However, if an extra discontinuity is in the dither range, a 0 is returned.

Figure 9:
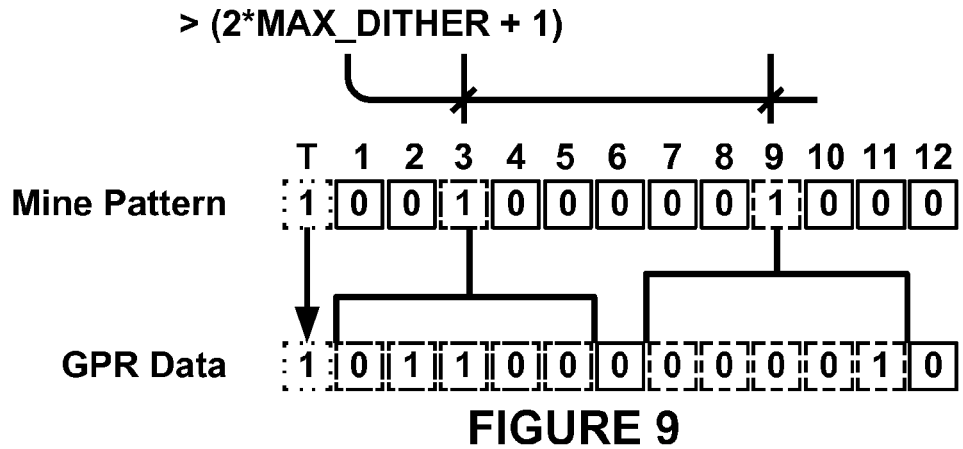
FIG. 9 is an example of a parallel correlator basic masking operation depicting masking operations when dither regions do not overlap as per an aspect of an embodiment of the invention.
Figure 10:
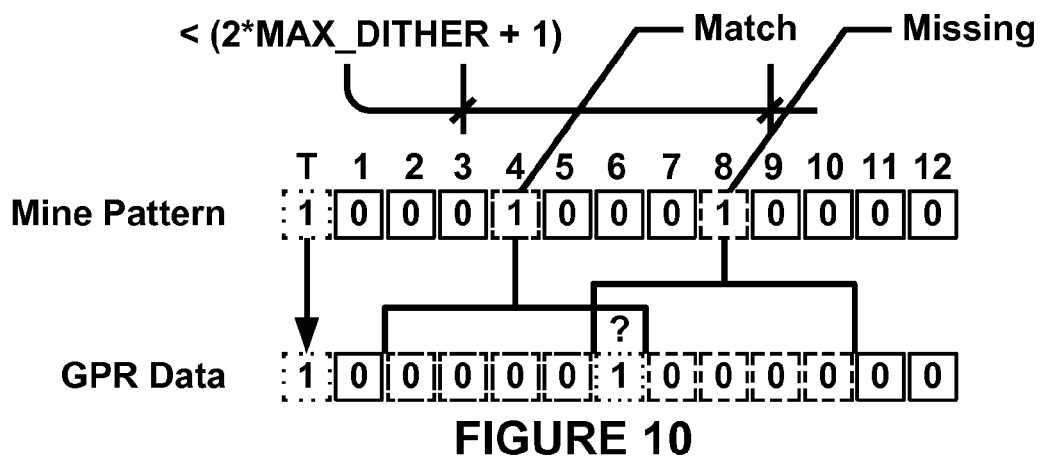
FIG. 10 is an example of a parallel correlator basic masking operation depicting masking operations when dither regions do overlap as per an aspect of an embodiment of the invention.
Figure 11:
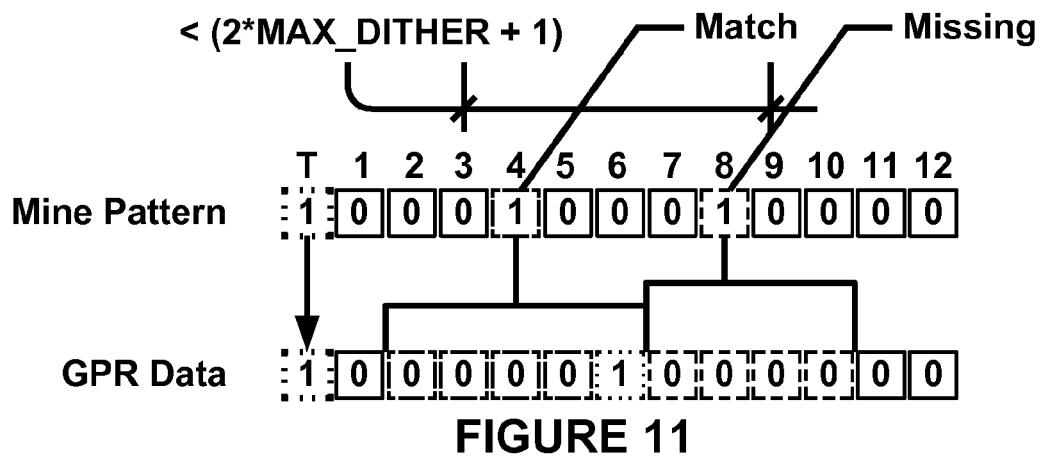
FIG. 11 is an example of a parallel correlator priority mask diagram as per an aspect of an embodiment of the invention.
Figure 12:
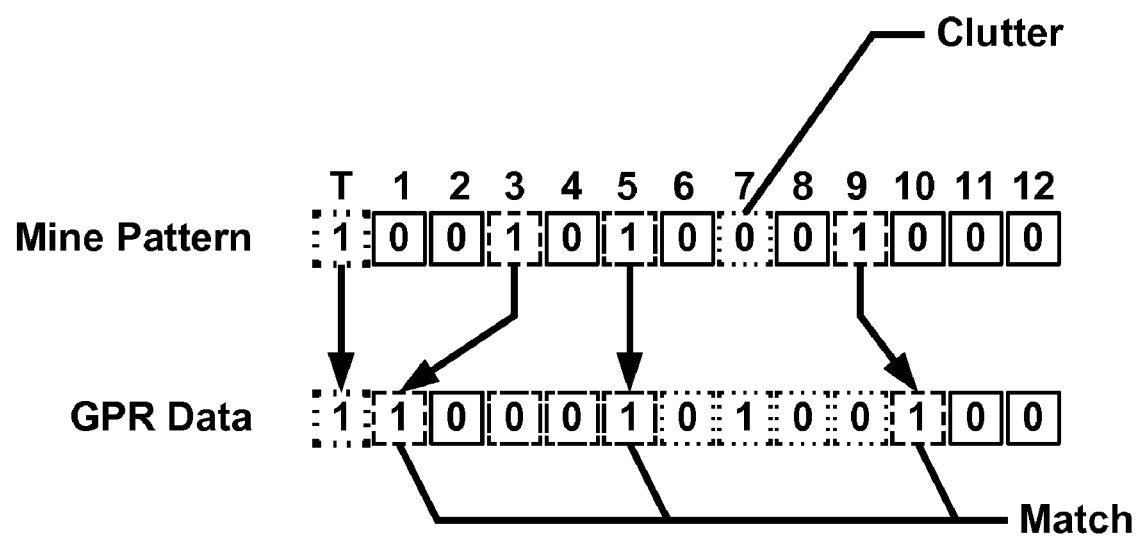
FIG. 12 is an example of a parallel correlator with multiple overlapping dither regions as per an aspect of an embodiment of the invention.

A current embodiment implements a priority dither masking to increase the accuracy of error reporting over that of simple XOR'd dithered impedance discontinuities. FIG. 9 shows an example of a parallel correlator basic masking operation depicting masking operations when dither regions do not overlap. FIG. 10 shows an example of a parallel correlator basic masking operation depicting masking operations when dither regions do overlap. FIG. 11 shows a parallel correlator priority mask diagram in which the priority methodology has selected the first 1 to match the 1 in position 4 and denied its use in matching the 1 in position 8. FIG. 12 shows a parallel correlator operation with multiple overlapping dither regions. In this example, the top of the object is found at T with a 1 in that position in both the mine pattern data and the GPR data. The first impedance discontinuity occurs early in position 1 of the GPR data rather than the expected position 3. The impedance discontinuity at position 5 in the pattern does occur at position 5 in the GPR data. A clutter occurs in position 7. The expected impedance discontinuity at position 9 occurs 1 position deeper in position 10. The "priority" is a key concept in this. This is most easily explained by comparing it to the FSM algorithm. The FSM has a natural priority that is created by its serial processing. The FSM begins processing data from the "top", or most shallow part of the data, or nearest data in range, down. As the FSM begins looking for matches between the mine pattern and the GPR data, it associates the first pair it can find. This is in contrast to the correlator which processes in parallel. When looking for a matching discontinuity in the GPR data to match a mine pattern discontinuity, if there are two points that both qualify the correlator has to decide which to apply it to. The same problem arises if there is a single GPR data point that could be associated with multiple mine pattern discontinuities.

If the proper associations are not made, this can significantly alter the error measurements, and ultimately affect the detection determination. There are two basic assumptions that are made explicit here similar to those that already exist in the reset FSM. The first is that the correct answer is the one that minimizes the error measurement, both in clutter and missing impedance discontinuity errors where each is weighted equally. The second it that associations are made from the top down giving associations closer to the top priority, hence the name.

A block diagram of an embodiment of a landmine detector with a parallel correlator pattern recognizer is shown in FIG. 8. Through the bus interface 810, two input data memories 520 and 540 may be programmed. There is the GPR cross-range scan memory 820 which, in this embodiment, holds an entire 417×24×1 cross-range scan of raw antennae data. This data may be fed to the preprocessing 824 by a preprocessing loader 522. This loader 822 reads the scan data from the memory 820, and creates a frame structure. The mine pattern memory 830 holds the sequence of 1's that represent the locations of mine impedance discontinuities and 0's which represent no impedance discontinuity. After processing is complete for the scan, the mine discriminator 890 writes the results to the detection statistics memory 840. An interrupt is generated across the bus 810 to indicate to the external control that data is ready to be read from the detection statistics 840.

The output data from this address may include the new present state as well as whether this new state is an accept or reject state. The parallel correlator discriminator 890 is a parallel processor pipelined for full throughput. It operates on the mine pattern 530 and a section of GPR scan data of matching length. The GPR data and mine pattern 530 can be combined in a series of pipelined masking operations 830, 840, 850, and 860, where the eventual result is two vectors, one showing the locations of clutter errors CSum 840, and the other missing errors MSum 860. These vectors may be summed for a total error count and compared to the detection criteria in threshold 870.

One possible method of integrating the preprocessing with the parallel correlator mine discriminator, where raw GPR data and the mine pattern 530 of interest are loaded, and detection statistics 540 can be read, across a bus interface 510. The sub-modules of the parallel correlator discriminator 890 are also shown in FIG. 8. The serial-to-parallel converter 810 for the GPR data resets at the beginning of a scan. After this, the sequence of impedance discontinuity data may be shifted in. When the pipe size, equal to the mine pattern, is fully loaded it can release the rest of the processing. Two error vectors may be created through the masking operations, one for clutter 840 and one for missing errors 860.

The parallel correlator pattern recognizer 890 may be implemented in synthesizable VHDL code. In the case of the parallel correlator discriminator 890, the primary dependency may be the length of the mine pattern; however, there may also be dependencies on the maximum dither, and to a lesser extent, on the maximum error counts. The parallel Correlator 890 may be dominated by the creation of the priority dither chain in both logical resource requirements and affecting the critical path since it creates both the critical path and requires the most resources. Parallel correlator metrics show the greatest dependency on the mine pattern length. This has dramatic affects on both the resource usage and the critical path, which all trace back to the priority dither mask calculations.

In this particular embodiment, the correlator may process a single GPR data scan depth location in only 5 clock cycles. The correlator is also fully pipelined, so a new calculation may start every clock cycle. This makes the processing time for an entire GPR data scan column approximately equal to the maximum depth of (depth GPR scan—length mine pattern+1) plus the 4 clock cycles for the initial pipelining delay, multiplied by the clock cycle period. For the basic configuration mine length of 100, this is a time of ((416−100+1)+4)*(113.177 ns)=~36.3 microsecond per column and ~871 microsecond for the entire crossrange scan.

With the preprocessing running at 100 MHz, the parallel correlator needs a multi-cycle path constraint of 12 to make timing. This allows for 10 unique mine patterns to be evaluated with a single parallel correlator discriminator.

Figure 13:
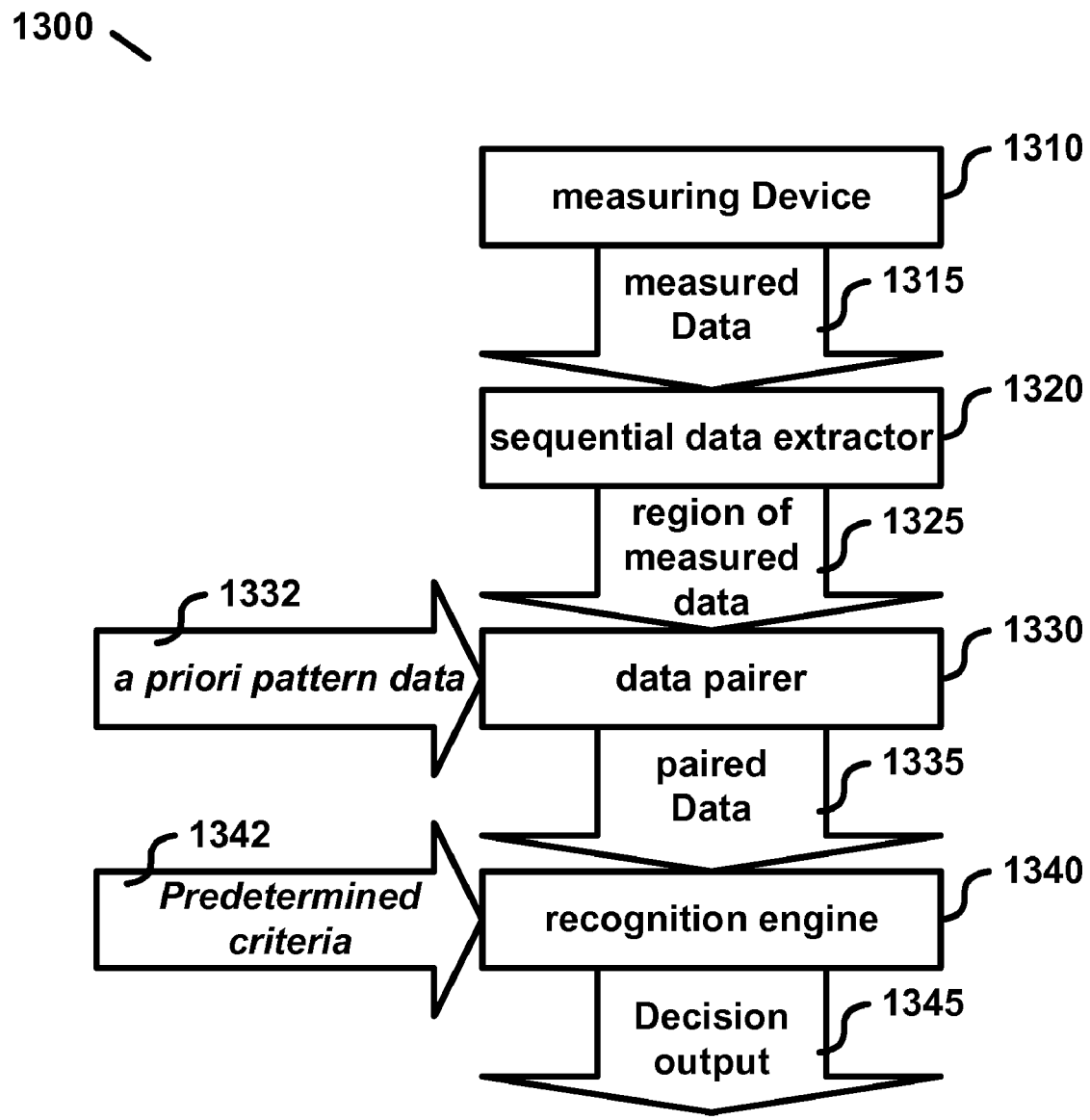
FIG. 13 is a block diagram of a GPR Processor as per an aspect of an embodiment of the invention.

FIG. 13 shows a block diagram of an example pattern recognizer 1300 as per an embodiment of the present invention. The pattern recognizer 1300 includes a sequential data extractor 1320, a data pairer 1330, and a recognition engine 1340. The sequential data extractor 1320 may be configured to extract a region of measured data 1330 from measured data 1315. The measured data 1315 may be obtained using a measuring device 1310. The measuring device 1310 is preferably capable of detecting changes in impedance. The changes in impedance may include a multitude of changes in impedance. The measured data 1315 should contain position information of the changes in impedance. The pattern measuring device 1310 may be many different devices that are preferably capable of detecting impedance changes such as: a RADAR, a ground penetrating RADAR, a high range resolution RADAR, a synthetic aperture RADAR, a sonar, an ultrasonic imaging device, an infrared sensor device, an x-ray device, or a backscatter x-ray device, or the like.

The data pairer is preferably configured to receive the region of measured data 1330 from the sequential data extractor and receive a priori pattern data 1332. The a priori pattern data 1332 should contain expected positions of the changes in impedance.

The recognition engine 1340 may generate a decision output 1345 to indicate whether the associated paired date 1330 (region of measured data 1325 and the a priori pattern data 1332) differ within a predetermined criteria 1342. The predetermined criteria 1342 may include: non-expected impedance changes (e.g., clutter and noise), excessive dither (i.e., the difference of the impedance change locations in the paired data), and missing impedance changes. The recognition engine 1340 may be implemented using many techniques including a reset finite state machine, a serial major-minor reset finite state machine, a parallel correlator, or the like.

The pattern recognizer 1300 may be implemented using programmable logic device(s) such as discrete logic, ASIC, FPGA, complex programmable logic device (CPLD), or custom IC(s). The pattern recognizer 1300 may also be implemented using a series of executable modules where each of the executable modules is embodied in a tangible computer-readable medium as a series of computer readable instructions. The tangible computer-readable medium may be a floppy disk, a DVD, a CD, a flash memory device, a server, or the like. Similarly, the pattern recognizer 1300 may be implemented using a tangible computer-readable medium containing a series of computer readable synthesizable modules. Each of the synthesizable modules may include a series of hardware description language instructions used to generate digital logic.

Figure 14:
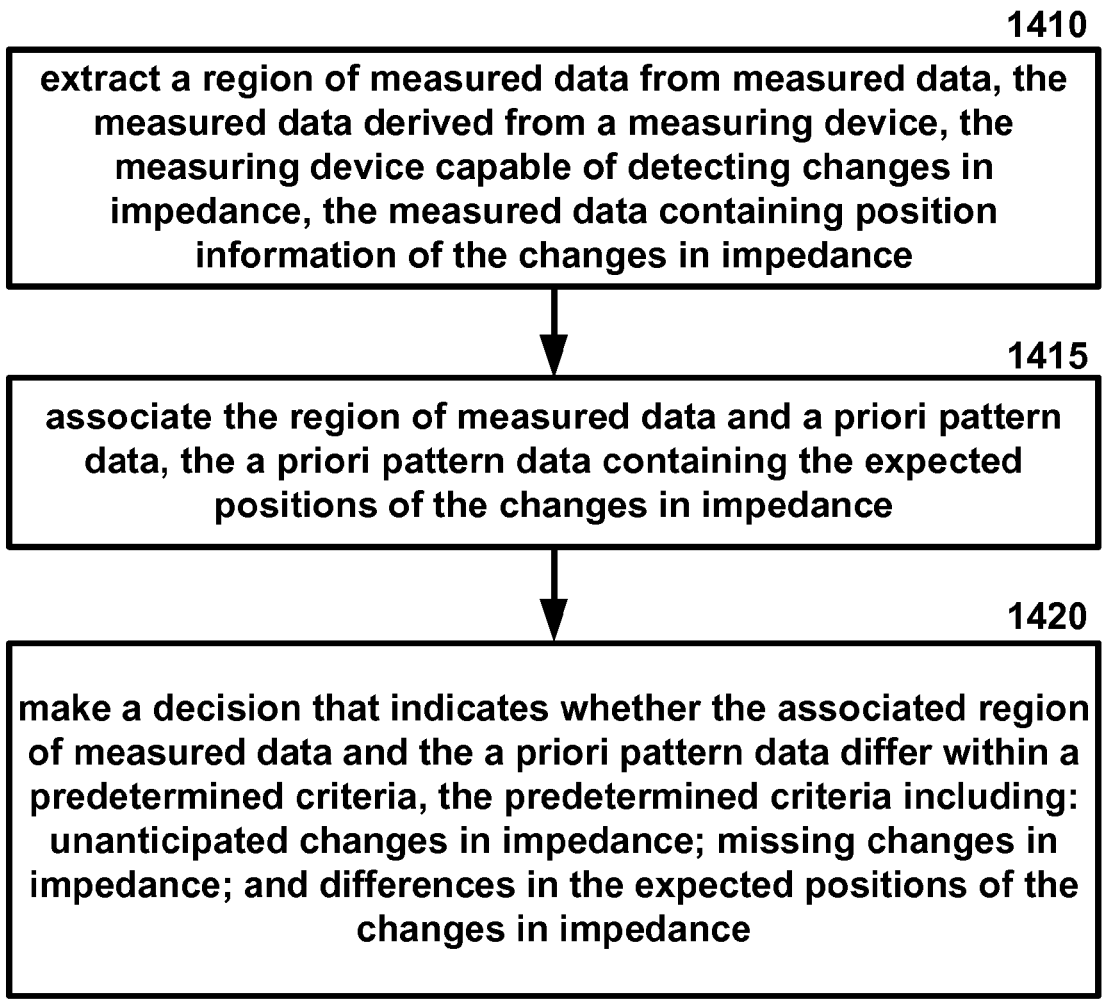
FIG. 14 is a flow diagram of a GPR Processor as per an aspect of an embodiment of the invention.

FIG. 14 shows a flow diagram of an embodiment of a method of pattern recognition. At 1410, a region of measured data may be extracted from measured data 1410. The measured data may be derived from a measuring device that is preferably capable of detecting changes in impedance (or a multitude of changes in impedance). The measured data should contain position information of the changes in impedance. The measuring device may be a device that may detect changes in impedance such as: a RADAR, a ground penetrating RADAR, a high range resolution RADAR, a synthetic aperture RADAR, a sonar, an ultrasonic imaging device, an infrared sensor device, an X-ray device, a backscatter X-ray device, or the like.

At 1415, the region of measured data and a priori pattern data may be associated. The a priori pattern data preferably contains the expected positions of the changes in impedance.

A decision that indicates whether the associated region of measured data and the a priori pattern data differ within a predetermined criteria may be made at 1420. The predetermined criteria may include: unanticipated changes in impedance, missing changes in impedance, differences in the expected positions of the changes in impedance, or the like. At least part of the decision may be made using a reset finite state machine, a serial major-minor reset finite state machine, a parallel correlator, or the like, or a combination thereof.

The method may be implemented using one or more programmable logic devices such as discrete logic, ASIC, FPGA, CPLD, or custom IC. The method may also be implemented as a series of executable modules that are embodied on a tangible computer readable medium as a series of computer readable instructions. The computer readable medium may be a computer disk, a CD, a DVD, a hard drive, a server, or the like. Similarly, the method may be implemented using a series of computer readable synthesizable modules stored on a tangible computer-readable medium. The synthesizable modules may include a series of hardware description language instructions used to generate digital logic configured to perform the method.

The following public references may be useful in enabling aspects of the claimed invention:

T. J. Desai and K. J. Hintz, "Volumetric Signal Processing Hardware Acceleration for Mine Detection," *Detection and Remediation Technologies for Mines and Minelike Targets VIII*; Russell S. Harmon, John H. Holloway, Jr., J. T. Broach; Eds., Proc. SPIE, vol. 5089, pp. 863-871, Orlando, Fla., April, 2003.

K. J. Hintz, "SNR improvements in NIITEK ground penetrating RADAR," *Detection and Remediation Technologies for Mines and Minelike Targets IX*; Russell S. Harmon, J. Thomas Broach, John H. Holloway, Jr.; Eds., Proc. SPIE, vol. 5415, pp. 399-408, Orlando, Fla., April 2004.

K. J. Hintz, "Development of a Language Recognizer for Detecting Non-Metallic Landmines in GPR Signals," Final Report: NIITEK PO No. S03-003-1 GMU, January 2005.

D. Kelley, *Automata and Formal Languages*. Prentice Hall: Englewood Cliffs, N.J., 1995.

K. Hintz, "Syntactic Landmine Detector," Non-Provisional patent application Ser. No. 11/247.325, Oct. 12, 2005.

K. Hintz, "Syntactic Target Classifier," Non-Provisional patent application Ser. No. 11/247,329, Oct. 12, 2005.

Behrooz Parhami, *Computer Arithmetic: Algorithms and Hardware Designs*. Oxford University Press:New York, 2000.

While various embodiments have been described above, it should be understood that they have been presented by way of example, and not limitation. It will be apparent to persons skilled in the relevant art(s) that various changes in form and detail can be made therein without departing from the spirit and scope of the invention. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on example(s) where a landmine is classified based on the return from a ground penetrating RADAR. However, one skilled in the art will recognize that embodiments of the invention could be used with many other measuring devices other than and distinctly different from a ground penetrating RADAR. The main characteristic of a measuring device is that it can receive a signal that contains processable information that may be used to identify and locate impedance discontinuities or other discontinuities in material or abstract data. Similarly, one skilled in the art will recognize that embodiments of the invention could be used to classify object other than landmine as long as the other objects generate repeatable impedance discontinuities or other discontinuities when viewed using a measuring device.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A pattern recognizer comprising:
   a) a sequential data extractor configured to:
      i) extract a region of measured data from measured data, the measured data obtained using a measuring device, the measuring device capable of detecting changes in impedance; and
      ii) processing the region of measured data to determine discrete position information of the individual changes in impedance;
   b) a data pairer configured to:
      i) receive the processed region of measured data from the sequential data extractor;
      ii) receive a priori pattern data, the a priori pattern data containing expected positions of the individual changes in impedance;
      iii) associate the processed region of measured data and the a priori pattern data;
   c) a programmable recognition engine device having a decision output, the decision output configured to indicate whether the associated processed region of measured data and the a priori pattern data differ within predetermined criteria, the predetermined criteria including:
      i) non-expected impedance changes;
      ii) excessive dither; and
      iii) missing impedance changes; and
   wherein the recognition engine is a serial major-minor reset finite state machine.

2. The pattern recognizer according to claim 1, wherein the changes in impedance is a multitude of changes in impedance.

3. The pattern recognizer according to claim 1, wherein the pattern recognizer is implemented in a programmable logic device.

4. The pattern recognizer according to claim 1, wherein the pattern recognizer is implemented using a series of executable modules, each of the executable modules is embodied in a tangible computer-readable medium as a series of computer readable instructions.

5. The pattern recognizer according to claim 1, wherein the pattern recognizer is implemented using a tangible computer-readable medium containing a series of computer readable synthesizable modules, each of the synthesizable modules including a series of hardware description language instructions used to generate digital logic.

6. The pattern recognizer according to claim 1, wherein the measuring device is at least one of the following:
   a) a RADAR;
   b) a ground penetrating RADAR;
   c) a high range resolution RADAR;
   d) a synthetic aperture RADAR;
   e) a sonar;
   f) an ultrasonic imaging device;
   g) an infrared sensor device;
   h) an X-ray device; and
   i) a backscatter X-ray device.

7. A non-transitory computer readable medium comprising a multitude of instructions configured to cause one or more processors to perform a method of pattern recognition comprising:
   a) extracting a region of measured data from measured data, the measured data derived from a measuring device, the measuring device capable of detecting changes in impedance;
   b) processing the region of measured data to determine discrete position information of the individual changes in impedance;
   c) associating the region of measured data and a priori pattern data, the a priori pattern data containing the expected positions of the individual changes in impedance; and
   d) making a decision that indicates whether the associated region of measured data and the a priori pattern data differ within a predetermined criteria, the predetermined criteria including:
      i) unanticipated changes in impedance;
      ii) missing changes in impedance; and
      iii) differences in the expected positions of the changes in impedance; and
   wherein the recognition engine is a serial major-minor reset finite state machine.

8. The non-transitory computer readable medium according to claim 7, wherein the changes in impedance is a multitude of changes in impedance.

9. The non-transitory computer readable medium according to claim 7, wherein the method is implemented in a programmable logic device.

10. The non-transitory computer readable medium according to claim 7, wherein the method is implemented as a series of executable modules, each of the executable modules embodied on a tangible computer readable medium as a series of computer readable instructions.

11. The non-transitory computer readable medium according to claim 7, wherein the measuring device is at least one of the following:
    a) a RADAR;
    b) a ground penetrating RADAR;
    c) a high range resolution RADAR;
    d) a synthetic aperture RADAR;
    e) a sonar;
    f) an ultrasonic imaging device;
    g) an infrared sensor device;
    h) an X-ray device; and
    i) a backscatter X-ray device.

12. The non-transitory computer-readable medium containing a series of computer readable instructions that when executed by one or more processors performs the method of claim 7.

13. A non-transitory computer-readable medium containing a series of computer readable synthesizable modules, each of the synthesizable modules including a series of hardware description language instructions employable by one or more processors to generate digital logic, the digital logic configured to perform a method comprising:
    a) extracting a region of measured data from measured data, the measured data derived from a measuring device, the measuring device capable of detecting changes in impedance;

b) processing the region of measured data to determine discrete position information of the individual changes in impedance;
c) associating the region of measured data and a priori pattern data, the a priori pattern data containing the expected positions of the individual changes in impedance; and
d) making a decision, using a serial major-minor reset finite state machine, that indicates whether the associated region of measured data and the a priori pattern data differ within a predetermined criteria, the predetermined criteria including:
   i) unanticipated changes in impedance;
   ii) missing changes in impedance; and
   iii) differences in the expected positions of the changes in impedance.

14. A pattern recognizer comprising:
a) a sequential data extractor configured to:
   i) extract a region of measured data from measured data, the measured data obtained using a measuring device, the measuring device capable of detecting individual changes in measured data; and
   ii) processing the region of measured data to determine discrete position information of the measured data;
b) a data pairer configured to:
   i) receive the region of measured data from the sequential data extractor;
   ii) receive a priori pattern data, the a priori pattern data containing expected positions of the individual changes in the measured data;
   iii) generating paired data by associating the region of measured data and the a priori pattern data;
c) a programmable serial major-minor reset finite state machine recognition engine device having:
   i) an input, the input configured to receive the paired data; and
   ii) a decision output, the decision output configured to indicate whether the associated region of measured data and the a priori pattern data differ within a predetermined criteria, the predetermined criteria including:
      (1) non-expected changes in the measured data in the paired data;
      (2) excessive dither in the paired data; and
      (3) missing impedance changes in the paired data.

* * * * *